(12) United States Patent
Crane et al.

(10) Patent No.: US 10,208,980 B2
(45) Date of Patent: Feb. 19, 2019

(54) SHELL DUCTINGS FOR COOL AIR DELIVERY

(71) Applicant: Hewlett-Packard Development Company, L.P., Houston, TX (US)

(72) Inventors: Robert Lee Crane, Fort Collins, CO (US); Tom J. Searby, Eaton, CO (US); Andrew L. Wiltzius, Fort Collins, CO (US); Mark J. Wierbilis, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/544,661

(22) PCT Filed: Apr. 17, 2015

(86) PCT No.: PCT/US2015/026470
§ 371 (c)(1),
(2) Date: Jul. 19, 2017

(87) PCT Pub. No.: WO2016/167805
PCT Pub. Date: Oct. 20, 2016

(65) Prior Publication Data
US 2017/0363316 A1    Dec. 21, 2017

(51) Int. Cl.
*G06F 1/20* (2006.01)
*F24F 13/02* (2006.01)

(52) U.S. Cl.
CPC ............. *F24F 13/02* (2013.01); *G06F 1/20* (2013.01); *F05D 2250/15* (2013.01)

(58) Field of Classification Search
CPC ............ H05K 7/20145; H05K 7/20836; H01L 23/467
USPC ...................... 361/679.46, 679.49
See application file for complete search history.

(56) References Cited

U.S. PATENT DOCUMENTS

| 5,077,601 A | 12/1991 | Hatada et al. |
| 6,462,948 B1 | 10/2002 | Leija et al. |
| 6,464,578 B1 | 10/2002 | Chin et al. |
| 6,474,409 B1 | 11/2002 | Sterner |

(Continued)

OTHER PUBLICATIONS

Oracle Corporation, "Sun Blade 6000 Modular System: Power and Cooling Efficiency," An Oracle White Paper, Mar. 2010, pp. 1-13.

(Continued)

*Primary Examiner* — Mukund G Patel
(74) *Attorney, Agent, or Firm* — International IP Law Group PLLC (57) ABSTRACT

An air duct is described herein. The air duct includes a duct housing having a first end and a second end and at least one vent disposed between the first end and the second end. The air duct also includes a plurality of dividers disposed between the first end and the second end and a plurality of channels. The plurality of channels are disposed between the first end and the second end and are derived from the plurality of dividers. The plurality of channels are to cool a first component and a second component of a computing device, wherein the duct housing is to encompass the first component and the second component. The duct housing is positioned with the first component located upstream of an air flow and the second component disposed downstream of the air flow.

15 Claims, 5 Drawing Sheets

(56) References Cited

U.S. PATENT DOCUMENTS

| | | | |
|---|---|---|---|
| 7,079,388 B2* | 7/2006 | Faneuf | H05K 7/20727 |
| | | | 361/679.51 |
| 7,209,352 B2 | 4/2007 | Chen | |
| 7,259,961 B2 | 8/2007 | Lucero et al. | |
| 7,643,292 B1 | 1/2010 | Chen | |
| 7,990,706 B2* | 8/2011 | Miyahara | H01L 23/467 |
| | | | 165/121 |
| 2006/0087810 A1 | 4/2006 | Rockenfeller | |
| 2007/0000649 A1 | 1/2007 | Peng | |
| 2012/0008276 A1 | 1/2012 | Cheng | |
| 2012/0175079 A1 | 7/2012 | Chang | |
| 2012/0212906 A1* | 8/2012 | Chang | G06F 1/20 |
| | | | 361/695 |
| 2013/0155613 A1 | 6/2013 | Chang et al. | |

OTHER PUBLICATIONS

PCT International Search Report and Written Opinion, dated Feb. 24, 2016, PCT Application No. PCT/US2015/026470, Korean Intellectual Property Office, 12 pages.

* cited by examiner

SHELL DUCTINGS FOR COOL AIR DELIVERY

BACKGROUND

Computing devices include a plurality of components housed within a chassis. Due to advancing semiconductor technology, the density of components within a chassis has increased. An increase of component density directly results in an increase of heat within the chassis, as each component contributes to a total amount of heat within the chassis.

BRIEF DESCRIPTION OF THE DRAWINGS

The advantages of the present examples are better understood by referring to the following detailed description and the attached drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Removal of heat generated by computing devices can be challenging. For example, the arrangement of devices within a chassis can prevent all devices from receiving the proper amount of cooling when cooled by a single air mover, such as a fan or blower. Moreover, some components have different levels of cooling needs, and can be located throughout the chassis. In some cases, the air flow is directed or reconfigured to cool pinpointed areas of the chassis. Ducts may be formed such that components at the farthest from the air mover receives air of a high temperature compared to components closest to the air mover.

A chassis, as described herein, is an enclosure that houses at least one computing component of a computing system. The chassis may also be plastic or metal housing that includes openings to facilitate air flow throughout the chassis. The chassis may be referred to as a server, a workstation, computing tower, desktop, all-in-one device, and the like. Computing components are any component of a computing system, such as a central processing unit (CPU), system on a chip (SoC), graphics processing unit (GPU), microcontroller, digital signal processor (DSP), storage device, memory device, input/output ports, etc.

Components of the computing system are to enable various computing functionality. For example, the processing units, such as the CPU, SoC, GPU, microcontroller, and DSP can be configured to execute stored instructions. The CPU can be a single core processor, a multi-core processor, a computing cluster, or any number of other configurations. In examples, the GPU may be configured to perform any number of graphics functions and actions. The memory device may be random access memory (RAM), read only memory (ROM), dynamic random access memory (DRAM), flash memory, or any other suitable memory system. The storage device can be a physical memory such as a hard drive, an optical drive, a thumb drive, an array of drives, or any combinations thereof. Each component is connected or coupled with other components via various buses and interfaces within the computing system. While several components are listed, this list is not an exhaustive list, as a computing system can contain any number and type of components, depending on the particular design on the computing system.

A component may generate heat during operation within the chassis. Further, each component may have operating temperature limits. If the air temperature within the chassis exceeds the operating temperature limits, there is a risk of overheating the component and ultimately failure of the component. Accordingly, the chassis includes an air mover to inject an air flow into the chassis that cools the air within the chassis and enables the temperature of the chassis components to remain within operating temperature limits. Depending on the arrangement of components within the chassis, some components can be downstream of other components, relative to the air mover. For example, if air is injected into the chassis at a first end, components closer to the first end receive air that has not been previously heated. However, a component that is downstream of another component may receive heated air, as the air has previously passed across an upstream component and is heated by removing heat from the upstream component. As used herein, an upstream component is a component that is close to an air mover along an air flow path such that the upstream component receives cooler air from the air flow. A downstream component is a component that is far from the air mover along an air flow path, such that air that reaches the downstream component is preheated by upstream components.

Examples described herein provide techniques to enable shell ducting for cool air delivery. An air duct enables cool air to reach downstream components that would otherwise be subjected to preheated, warmed air. This cool air delivery enables lower fan speeds, which results in lower fan noise. Additionally, the present techniques result in a higher thermal margin when compared to traditional ducting methods.

Figure 1A:
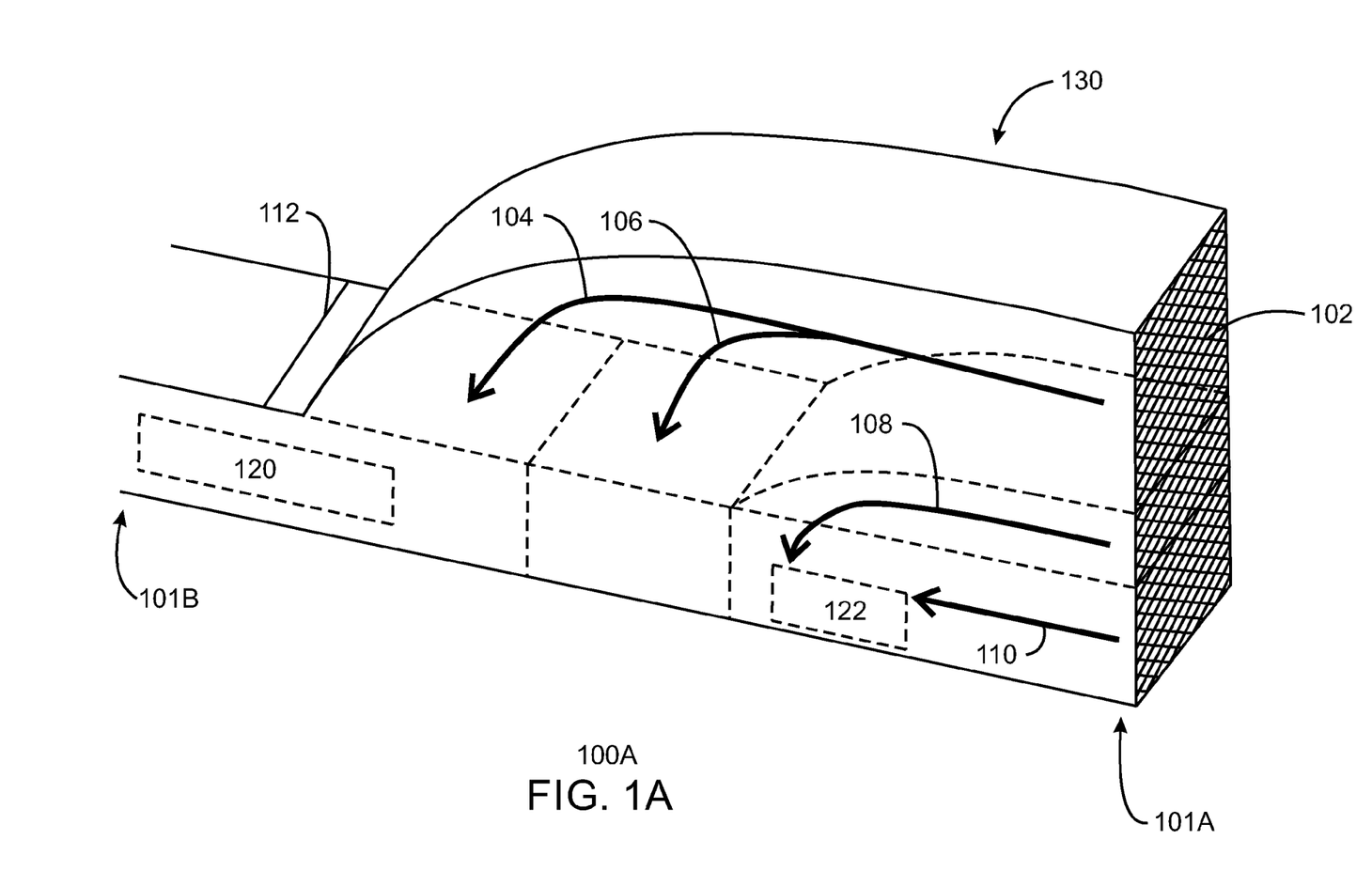
FIG. 1A is a perspective view of an example air duct.

FIG. 1A is a perspective view of an example air duct 100A. The air duct 100A may include an air duct housing 130. In examples, the air duct housing 130 may be formed from plastic, metal, or any other suitable materials. Items within the air duct along with contours of the air duct are represented by dotted lines. The air duct 100A may be within a computing chassis. The computing chassis may be a server, a workstation, computing tower, desktop, all-in-one device, and the like. The air duct includes a first end 101A and a second end 101B. The first end 101A is positioned closest to an air mover, and a second end 101B is positioned farthest away from the air mover. The area 102 indicates the location of an air mover with respect to the air duct 100A. In examples, an air mover is positioned such that air can flow from the first end 101A of the air duct to a second end 101B of the air duct.

Specifically, air flow is directed through channels within the air duct. The channels direct air to components along the air duct 100A. The air travel can move along an arrow 104, arrow 106, arrow 108, or an arrow 110. The air duct includes dividers that are to direct or reconfigure the air across components within the air duct. The air is directed or reconfigured as illustrated by the arrow 104, arrow 106, arrow 108, and arrow 110. A component 120 and a component 122 are cooled by the air flow as illustrated by the arrow 104, arrow 106, arrow 108, and arrow 110. In an example, the components are two high powered banks of memory. In such an example, both banks of memory are cooled by cool air, and the cool air can reach the downstream or rear bank of memory. A vent 112 may span the width of an upper portion of the air duct 100A. The vent 112 enables air to escape the air duct 100A prior to exiting the air duct at the far end. In this manner, the air temperature within the air duct 100A is reduced when compared to an air duct without venting.

A plurality of interior dividers of the air duct may be based on a shell geometry. For example, the shape of the interior dividers may mimic the internal appearance of a Nautilus shell. The cool air at one end of the duct passes through these interior shell dividers and is delivered at several locations further downstream so it provides cool air to those components further inside the chassis. In examples, the design will cool separate banks of memory, one in front of the other. However, the air duct can be used for any situation where one wants to provide cool air to downstream components.

Figure 1B:
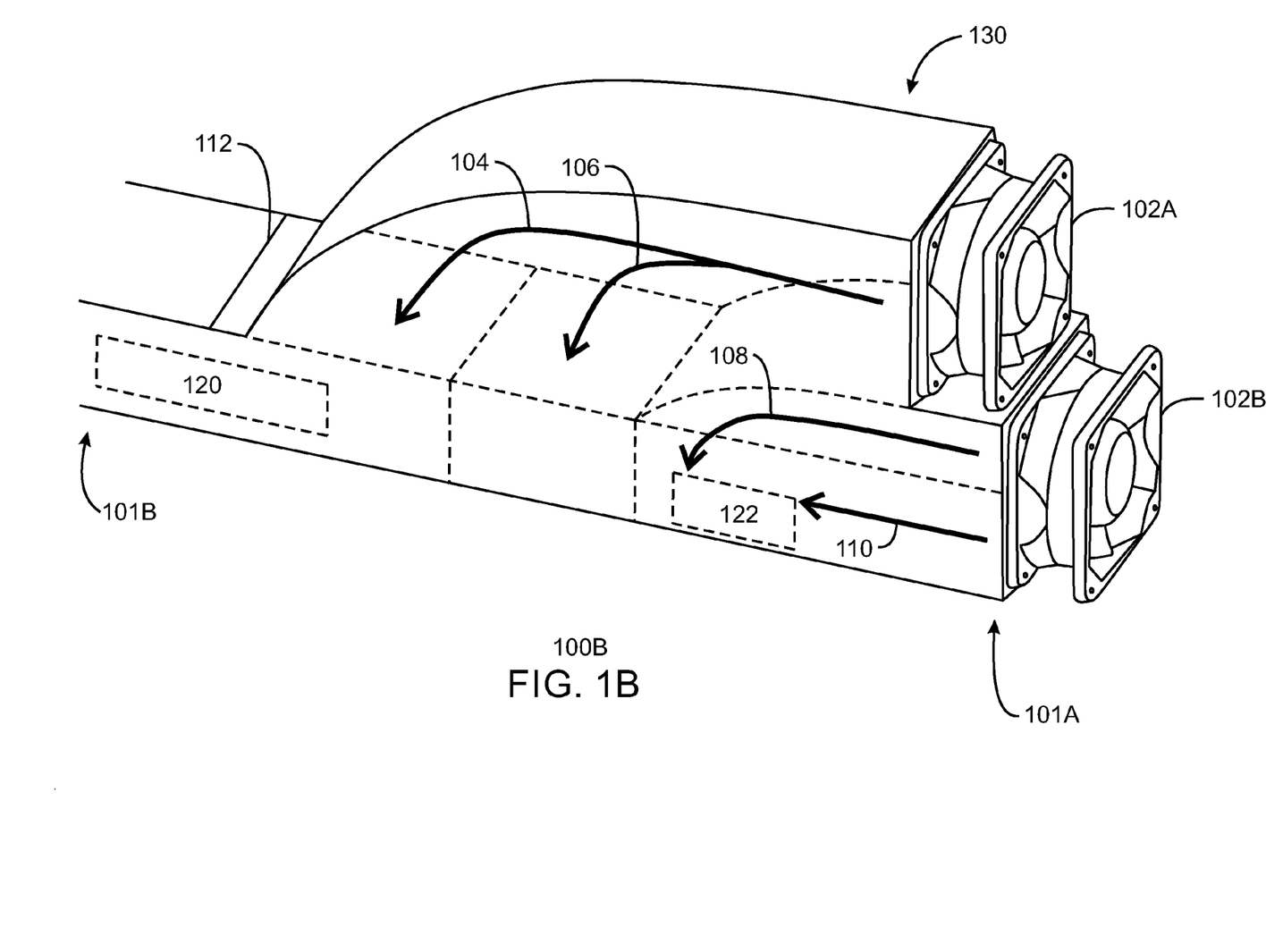
FIG. 1B is a perspective view of an example air duct.

FIG. 1B is a perspective view of an example air duct 100B. The air duct 100B may be similar to the air duct 100A, including an air duct housing 130. The air duct 100B may be within a computing chassis, and the computing chassis may be a server, a workstation, computing tower, desktop, all-in-one device, and the like. Similar to the air duct 100A, the air duct 100B includes a first end 101A and a second end 101B. The first end 101A is positioned closest to an air mover, and a second end 101B is positioned farthest away from the air mover. Accordingly, an air mover is positioned such that air can flow from the first end 101A of the air duct to a second end 101B of the air duct.

The air mover of the air duct 100B is illustrated as a fan 102A and a fan 102B. Each of the fan 102A and the fan 102B are to direct air into the air duct 100B. In examples, the fans 102A and 102B create a nested configuration. The nested configuration occurs when multiple fans are located upstream, where each fan is to cool a different set of components. The nested configuration enables the air duct to be modular in application. For example, when the component 122 is a memory bank and is the only memory bank of the system (the component 120 is not present) the fan 102A can be removed from the system.

Similar to FIG. 1A, the interior dividers of air duct 100B may be based on a Nautilus shell geometry. The cool air generated by the fan 102A and the fan 102B can pass through shell shaped dividers and is delivered at several locations via a plurality of channels along the length of the air duct, such that cool air is provided to those components throughout the chassis. The channels direct air to components along the air duct 100B. The components may be disposed within the air duct 100B and direct air to travel along an arrow 104, arrow 106, arrow 108, and an arrow 110. The air duct 100B also includes a vent 112 to enables air to escape prior to exiting the air duct at the far end.

The air duct prevents components, such as a higher power memory, from preheating the air delivered to downstream components. Further, the air duct described herein enables a greater number of chassis designs. Since cool air can be delivered to locations throughout the chassis, cooling ability and proximity to an air mover does not limit the placement of components within the chassis. Moreover, downstream components do not rely on pre-heated air for cooling purposes.

While two fans have been illustrated, a single fan or blower can be used as the primary air mover at the cool side of the duct. The interior shell partitions enable cool air to reach the downstream memory bank regardless of the number of air movers. Moreover, the shell shape of the dividers enables the air mover to operate at a lower speed, as a lower velocity of air is needed to keep components within the chassis cool. The slower fan speed results in lower noise due to fan speeds.

Figure 2:
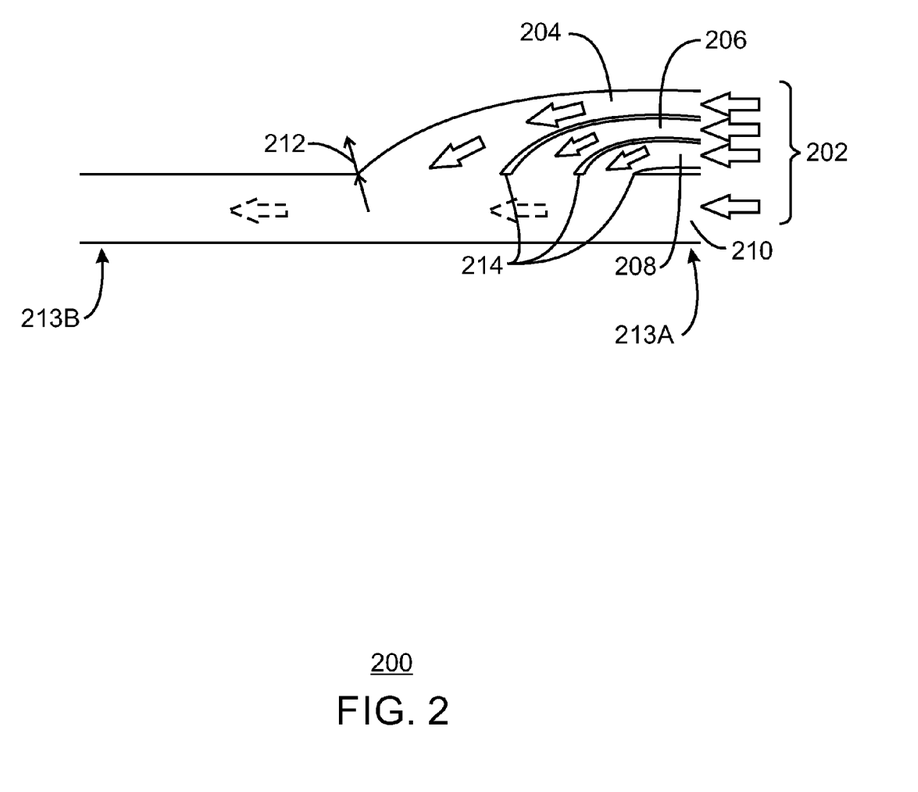
FIG. 2 is an illustration of air flow through an air duct, according to an example.

FIG. 2 is an illustration of air flow through an air duct 200, according to an example. Cool air flow is provided by an air mover as indicated by the arrows at reference number 202. In examples, a plurality of air movers is to supply air flow to the air duct 200. The air flow is directed into a plurality of channels. The channel 204, channel 206, channel 208, and the channel 210 include arrows to indicate the general flow of air from the air mover. Channel 210 includes dashed line arrows that indicate cool air that has warmed by cooling components of a system include the air duct, or by heated air from the channel 204, channel 206 and channel 208 mixing with air flow in the channel 210. Although channel 210 includes dashed line arrows representing heated air, the particular location of when the air flow becomes heated is dependent upon system design. The channels, dividers, and vent can be adjusted to accommodate any system design and are described here for example purposes.

To mitigate the temperature of air in the channel 210, an air vent 212 may be placed along the air duct, disposed between a first end 213A and a second end 213B of the air duct. Air may be vented from the air vent as illustrated by the arrow through the air vent 212. In this manner, air within the air duct can be maintained at a lower temperature by enabling heated air to escape the air duct prior to the second end 213B of the air duct. A plurality of dividers 214 used to form the channel 204, channel 206, channel 208, and channel 210. In examples, the dividers 214 are similar in appearance to those of a Nautilus shell. Further, in examples the shell shape of the dividers results in a lower pressure drop throughout the air duct. The lower pressure drop may be a result of a changing width of the channels. Since the pressure drop is lowered, a fan can operate at a lower speed to move air through the air duct. When an air pressure drop is high, an air mover outputs air at a higher velocity to compensate for the drop in air pressure. The shell shape may also be based on the Fibonacci Series, such that the spiral or curved shape of the dividers result in a logarithmic spiral. The dividers can be positioned to be proportioned according to the Golden Ratio. For example, an imaginary starting point may have several dividers extending from it, similar to the curves of a Nautilus shell. Dividers may extend from the center outwards such that the ratio of an imaginary spiral extending from each divider is approximately 1.6.

Through the present techniques, cool air is able to be provided downstream of the air mover within a chassis, and heated air is not provided to the downstream components. An increase in air velocity is not necessary to ensure the downstream components receive cool air. Further, in examples, the air duct as described herein does not require multiple openings in the chassis to provide cool air to downstream components of the chassis. In examples, the air duct can be manufactured using various methods. For example, one method would be plastic molding, another method could be sheet metal forming.

Figure 3:
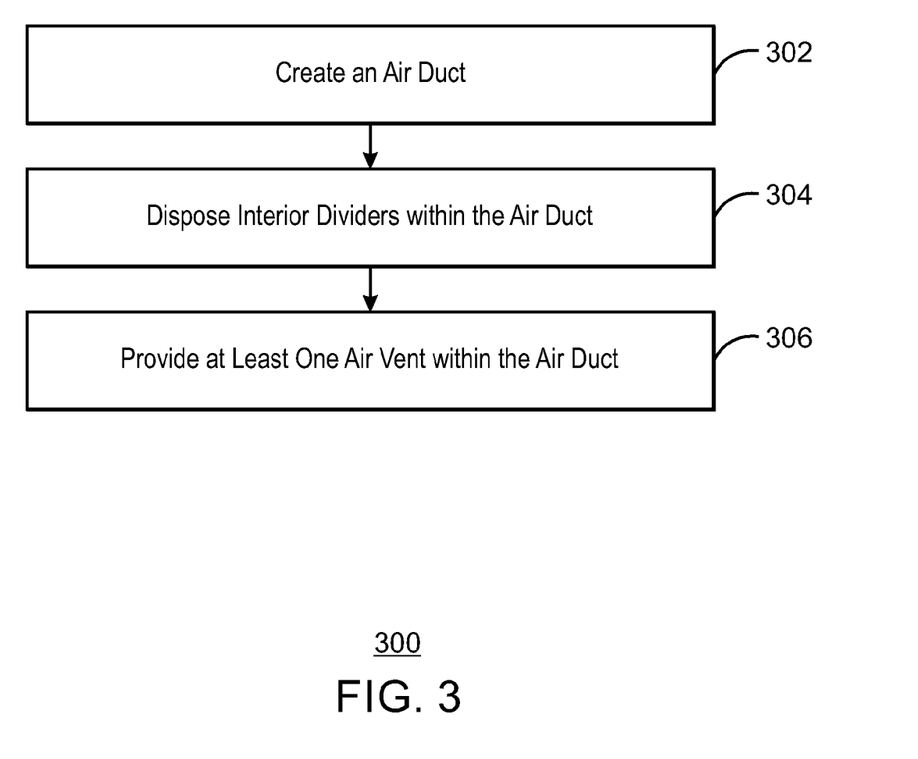
FIG. 3 is a process flow diagram of an example method for cooling heat-producing components.

FIG. 3 is a process flow diagram of an example method 300 for cooling heat-producing components. At block 302, an air duct is created. The air duct may have a first end and a second end. In examples, the first end is positioned nearest an air mover. At block 304, interior dividers are disposed within the air duct. The interior dividers may be based on a Nautilus shell geometry. At block 306, at least one air vent is provided within the air duct. The air vent enables air within the air duct to escape prior to exiting the air duct at the far end.

Figure 4:
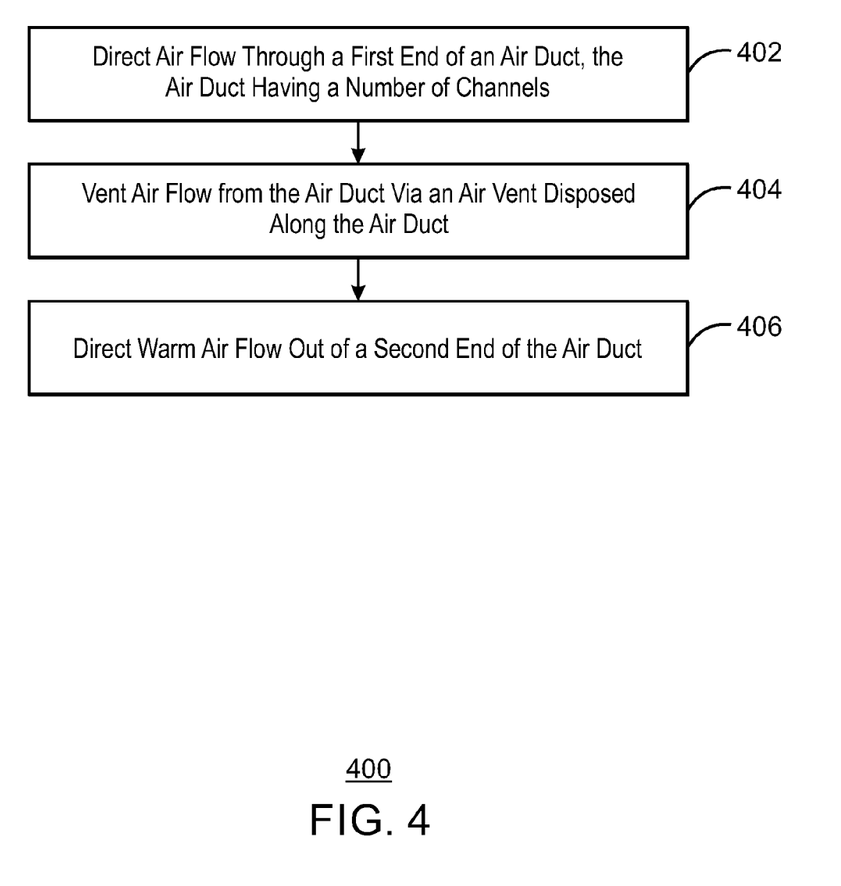
FIG. 4 is a process flow diagram of an example method for configuring air flow through an air duct.

FIG. 4 is a process flow diagram of an example method 400 for configuring air flow through an air duct. At block 402, air flow may be directed through a first end of the air duct, and the air duct may have a number of channels. Accordingly, air flow is directed from the first end of the air duct to the second end of the air duct. The number of channels are created by interior dividers to deliver air to cool components father downstream in the air duct. In examples, air flow may be generated by a plurality of fans. At block 404, air flow may be vented from the air duct via an air vent disposed along the air duct. In examples, the air vent is disposed between a first end and a second end of the air duct. The air vent is to vent warm air from the air duct. At block 406, warm air flow is directed out of a second end of the air duct.

Through the present techniques, cool air is delivered to specific locations downstream in order to provide even cooling throughout the chassis. This may result in a higher thermal margin or lower noise depending on the particular goals of the design. In examples, upstream heat is mitigated in the fact that it does not contribute to the thermal margin of downstream components. As used herein, a thermal margin is a measure how far the current operating temperature is below a collective maximum operating temperature within the chassis. The thermal margin may also be a measure of how far the current operating temperature of a component is below a maximum operating temperature of the component.

While the present techniques may be susceptible to various modifications and alternative forms, the embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. An air duct, comprising:
   a duct housing having a first end and a second end;
   at least one vent disposed between the first end and the second end, wherein the at least one vent spans a width of an upper portion of the duct housing and directs air through the at least one vent to reduce an air temperature within the air duct;
   a plurality of dividers disposed between the first end and the second end;
   a plurality of channels disposed between the first end and the second end, wherein the channels are derived from the plurality of dividers, and the plurality of channels are to cool a first component and a second component of a computing device, wherein the duct housing is to encompass the first component and the second component, and the duct housing is positioned with the first component located upstream of an air flow and the second component disposed downstream of the air flow.

2. The air duct of claim 1, wherein the plurality of dividers are based on a Nautilus shell geometry.

3. The air duct of claim 1, wherein air flow is directed from the first end of the air duct to the second end of the air duct.

4. The air duct of claim 1, wherein an air mover is disposed at the first end of the air duct.

5. The air duct of claim 1, wherein a fan is disposed at the first end of the air duct.

6. The air duct of claim 1, wherein the separate components are a first memory bank and a second memory bank.

7. A system for cooling, comprising:
   an air mover;
   an air duct comprising a first end, a second end, and at least one vent disposed between the first end and the second end, wherein the at least one vent spans a width of an upper portion of the air duct and directs air through the at least one vent to reduce an air temperature within the air duct;
   a plurality of dividers disposed between the first end and the second end; and
   a plurality of channels disposed between the first end and the second end,
   wherein the channels are created by the plurality of dividers;
   a plurality of components, wherein a first channel cooling is to cool a first component, and wherein a second channel is to cool a second component.

8. The system of claim 7, wherein the channels are formed by a plurality of shell shaped dividers.

9. The system of claim 7, wherein the plurality of dividers are based on a Nautilus shell geometry.

10. The system of claim 7, wherein the air mover is a plurality of fans.

11. The system of claim 7, wherein the air mover is a single fan.

12. An apparatus for cooling, comprising:
    a first end;
    a second end;
    at least one vent disposed between the first end and the second ends wherein the at least one vent spans a width of an upper portion of the air duct and directs air through the at least one vent to reduce an air temperature within the air duct;
    a plurality of dividers disposed between the first end and the second end; and
    a plurality of channels disposed between the first end and the second end, wherein the channels are derived from the plurality of dividers; and
    a plurality of components, wherein a first channel cooling is to cool a first component via a first air mover, wherein a second channel is to cool a second component via a second air mover, and wherein the first air mover and the second air mover are in a nested configuration.

13. The apparatus of claim 12, wherein the dividers are based on a Nautilus shell geometry.

14. The apparatus of claim 12, wherein heated air from the nested configuration is vented after cooling a component.

15. The apparatus of claim 12, wherein the first air mover is a first fan and the second air mover is a second fan.

* * * * *

UNITED STATES PATENT AND TRADEMARK OFFICE
CERTIFICATE OF CORRECTION

PATENT NO. : 10,208,980 B2
APPLICATION NO. : 15/544661
DATED : February 19, 2019
INVENTOR(S) : Robert Lee Crane et al.

It is certified that error appears in the above-identified patent and that said Letters Patent is hereby corrected as shown below:

In the Claims

In Column 5, Line 49, Claim 1, after "end;" insert -- and --.

In Column 6, Line 40 approx., Claim 12, delete "ends" and insert -- end, --, therefor.

Signed and Sealed this
Fourteenth Day of May, 2019

Andrei Iancu
*Director of the United States Patent and Trademark Office*